United States Patent [19]
Bachmann

[11] Patent Number: 5,249,515
[45] Date of Patent: Oct. 5, 1993

[54] APPARATUS FOR EXTRACTING FRUIT JUICE FROM CITRUS FRUITS

[76] Inventor: Marco Bachmann, Restelbergstrasse 53, 8044 Zürich, Switzerland

[21] Appl. No.: 916,147
[22] PCT Filed: Dec. 10, 1991
[86] PCT No.: PCT/CH91/00256
 § 371 Date: Jul. 31, 1992
 § 102(e) Date: Jul. 31, 1992
[87] PCT Pub. No.: WO92/10108
 PCT Pub. Date: Jun. 25, 1992

[30] Foreign Application Priority Data
Dec. 14, 1990 [DE] Fed. Rep. of Germany ....... 4040087

[51] Int. Cl.5 .................................. A23N 1/00
[52] U.S. Cl. ........................ 99/504; 99/501; 99/507; 99/508
[58] Field of Search ............. 99/495, 496, 501–508; 100/98 R, 116, 218

[56] References Cited
U.S. PATENT DOCUMENTS

| 1,620,551 | 3/1927 | Hughes . | |
|---|---|---|---|
| 1,834,097 | 12/1931 | Gum . | |
| 1,888,529 | 11/1932 | Faulds | 99/502 |
| 2,065,271 | 12/1936 | Faulds | 99/502 |
| 2,540,772 | 2/1951 | Woodruff . | |
| 2,630,849 | 3/1953 | Williams | 99/504 |
| 2,753,904 | 7/1956 | Trainor | 99/504 |
| 3,060,984 | 10/1962 | Wurgaft . | |
| 3,103,239 | 9/1963 | Alexander et al. | 99/504 |
| 4,421,021 | 12/1983 | Holbrook | 99/495 X |
| 4,479,424 | 10/1984 | Carroll | 100/98 R X |

FOREIGN PATENT DOCUMENTS
0376390 7/1990 European Pat. Off. .

Primary Examiner—Timothy F. Simone
Attorney, Agent, or Firm—Watson, Cole, Grindle & Watson

[57] ABSTRACT

A processing station is encased by a wall of a housing and lever pivot axes project from opposite sides thereof into the processing station which carry at their respective ends an arm with a clamping jaw for holding a citrus fruit. The clamping jaws guide the citrus fruit in a movement along a quarter of a circle over a horizontally and upstanding positioned knife in order to bisect the fruit. A double side rasping head is located under the knife which is rotatably driven and against which the fruit halves held in the clamping jaws are moved from opposite sides. Pins which are located inside at the wall of the housing push during the movement of the clamping jaws away from each other through these jaws the rasped rinds to eject same. The juice dripping downwards is collected and the rinds are transported by means of a wiper arm into a laterally positioned outlet chute.

7 Claims, 3 Drawing Sheets

APPARATUS FOR EXTRACTING FRUIT JUICE FROM CITRUS FRUITS

BACKGROUND OF THE INVENTION

1. FIELD OF THE INVENTION

The present invention relates to an apparatus for extracting fruit juice from citrus fruits which have a rind, which apparatus includes a supply container and a processing station adapted to receive single fruits individually from the supply container, which processing station includes holding members adapted to grip and hold one fruit, which holding members are located coaxially opposite each other and are moveable in an axial direction, and includes a double side rasping head.

2. DESCRIPTION OF THE PRIOR ART

For the extraction of juice from a fruit by using a rasping head which in the most simple application is utilized in apparatuses which are common for domestic use, and specifically either by a manual rotating of the bisected fruit and exertion of pressure against a cone shaped rasping head, or by means of a mechanized apparatus having a rasping head which automatically begins to rotate upon exertion of pressure against the stationary held fruit half, provides the best results in recovering flavorful juice. With other known and fully mechanized apparatuses having an automatic feed and removal of the empty rinds, the bisected fruits are pressed out by means of sort of a pistle, or holes are cut out of the rind and the juice is pressed out through these holes by means of pressure applied onto the rind, which always leads to the effect that parts of the rind and also bitter constituents reach the fruit juice and influence its flavour quite negatively, the extent of this negative influence depending on the type of fruit and other factors.

European application EP 03 76 390 A 1 discloses an apparatus for a mechanized extracting of fruit juices from citrus fruits which, however, has the drawback that it is only possible to process fruits which are sorted in accordance with their size, or where the holding members of the apparatus for holding the fruit must be exchanged, respectively. Furthermore, the fruit is held by means of a vacuum in the rotating holding members, which, due to the rotation and simultaneous capability of an axial displacing of the holding members, necessitates rotatable vacuum connections and also flexible driving shafts. The extremely intrinsic structured apparatus which is quite prone to breakdowns is thereby not at all used for a rubbing out or rasping out, resp. of fruit halves, the rind of the rotating fruit is thereby rather cut in a groove like fashion and thereafter the entire fruit is taken out of the previously cut rind by means of a rotating peeling knife having an offset semicircular shape and thereafter only the rest of the fruit pulp remaining in the two half shells is rasped off by means of a double sided rasping head. Because this known apparatus operates according to the complicated principle of separating the rind from the entire fruit, instead of merely rasping fruit halves and even so cannot process unsorted fruits, it is specifically not suitable for the processing of cheap wares specifically suitable for an economic extraction of fruit juices,as unsorted fruits are cheaper.

Because citrus fruits such as oranges have quite differing diameters, the method of extracting juice from such citrus fruits by a rasping with a fully mechanized apparatus which necessitates only the filling of a supply container and which allows to simply run the extracted fruit juice without any further manual labor off the tap has not yet been solved satisfactory, while the already mentioned, technically more simpler solvable pressing out method has the drawback of a negative influence on the flavour due to bitter constituents of the rind and, furthermore, the drawback of a less complete recovery of the juice.

SUMMARY OF THE INVENTION

It is, therefore, a general object of the present invention to mechanize the extracting of fruit juice by a rasping out of fruit which do not always have a uniform size by means of structures which are suitable for simple courses of movements, such as to obtain fruit juices into which no constituents of the rind can enter.

A further object is to provide an apparatus which comprises pivoting arms and in which holding members are structured as clamping jaws arranged at a respective pivot arm, which pivot arms are arranged at respective lever pivot axes which are axially displaceable and rotatable around a common axis in order to move the clamping jaws between two pivotal positions; comprising a knife located in a plane centrally between the planes of the pivoting movement of the clamping jaws, which knife is adapted to bisect a fruit which is gripped and held in a first pivotal position of the clamping jaws by an axial displacement of the lever pivot axes during the movement of the fruit along an arc of the pivoting movement intersecting the knife at an angle; and in which the halves of the fruit held after the passing of the knife in the clamping jaws are adapted to be pressed in a second pivotal position by means of the in axial direction displaceable clamping jaws against the double side rasping head adapted to be rotationally driven.

The ad-vantage of the apparatus is that the fruit is rubbed or rasped out, resp. after the bisecting by a relative movement between fruit and knife corresponding to the common cutting procedure, by means of a rotating rasping head operating simultaneously on both fruit halves, whereby the further advantage is that by means of the elastically supported knife fruits of differing sizes and weights can be processed in an arbitrary succession. For this task the upstanding mounted knife which is pivotably supported at one end is held at its other end onto which the fruit falls out of the supply container between the clamping jaws by means of a spring, such that in case of a move heavy and larger fruit the knife is held somewhat lower than in case of a lighter fruit and thus in a weight dependent manner relative to the centers of the two clamping jaws supported centrally. Between the gripping of the fruit and the rasping by means of the rasping head, the clamping jaws make a pivotal movement along a quarter of a circle and simultaneously an opening movement by an axial displacement of the pivot axes in order to bring the two fruit halves in front of the rasping head, which movements are produced preferably by simple cam controls. This controlling by means of cams allows also a short interruption during the return movement of the clamping jaws into their initial position in order to move by a short axial movement of the clamping jaws backwards against stationary arranged ejector pins which push the rasped rinds of the fruit out through bore holes in the clamping jaws, in which the not jet rasped fruit halves are held by a central spine.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE PREFERRED EMBODIMENT

Figure 1:
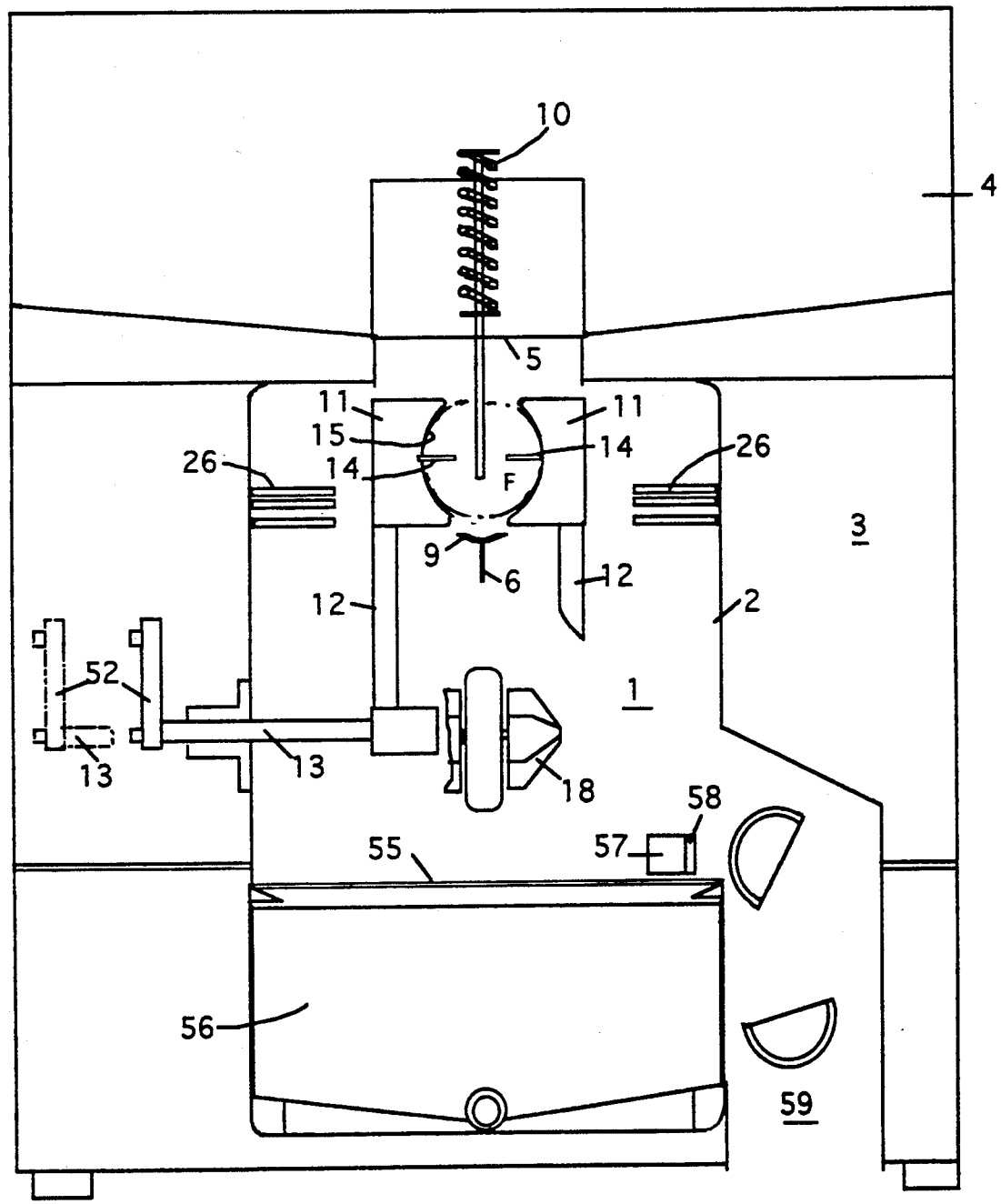
FIG. 1 is a schematic front view of the apparatus without its front wall.

The apparatus includes a processing station 1 in which the citrus fruits are processed and the juice is extracted and which is separated by a housing 2 from a chamber 3 bordering same at three sides, in which the drive and control means for the processing station are housed. A supply container 4 having a discharge opening 5 located at its bottom area is located above the processing station 1, which container 4 is adapted to hold a large amount of citrus fruits which one after the other fall through the opening 5 down into the processing station 1. One of the ends of an upstanding knife 6 is located in the line of fall of the fruit, which knife 6 is mounted at this end to a supporting body 7 which broadens the knife 6 there towards both sides, which supporting body 7 includes at the upper area a supporting body 8 for the fruit which has the shape of a quarter of a circle and includes, furthermore, below the center of the fruit at the left and the right side one supporting cup 9. A pivotable blocking arm 9a prevents the fruit from rolling away sideways along the upper edge of the knife. The supporting body 7 is suspended at the outer end by a pressure spring 10 in such a manner that the upstanding knife which is pivotally mounted at its other end to the housing 2 of the processing station is in a position to conduct pivotal movements in the vertical direction. Due to the characteristic of the spring 10, the knife 6 which is suspended by the spring moves always into such a pivotal position that the center of a fruit resting on the end of the knife and the supporting body 7 and the supporting cups 9 is always located substantially at the same height level, and specifically in case of a smaller and lighter fruit as well as in case of a fruit having a larger diameter and accordingly higher weight, where in case of latter the knife 6 pivots somewhat downwards due to the weight, such that the center of this fruit is located at the desired height level, and specifically at the height of the center of two clamping jaws 11, which are held to the left and to the right side of the fruit in the standby position and at such a distance from each other that the fruit can fall between the clamping jaws 11 onto the end of the knife. The clamping jaws 11 are respectively mounted to an end of a pivot arm 12 which is arranged at its respective other end at a respective lever pivot axis 13. Each clamping jaw 11 includes a holding spine 14 which spines face each other at the two clamping jaws, and further projections 16 arranged at the concave bulged inner surface 15 of the clamping jaw 11, which projections 16 project in a rib-like manner and extend radially and are evenly distributed circumferentially, which projections 16 are adapted to hold the fruit during the subsequent rasping.

Figure 2:
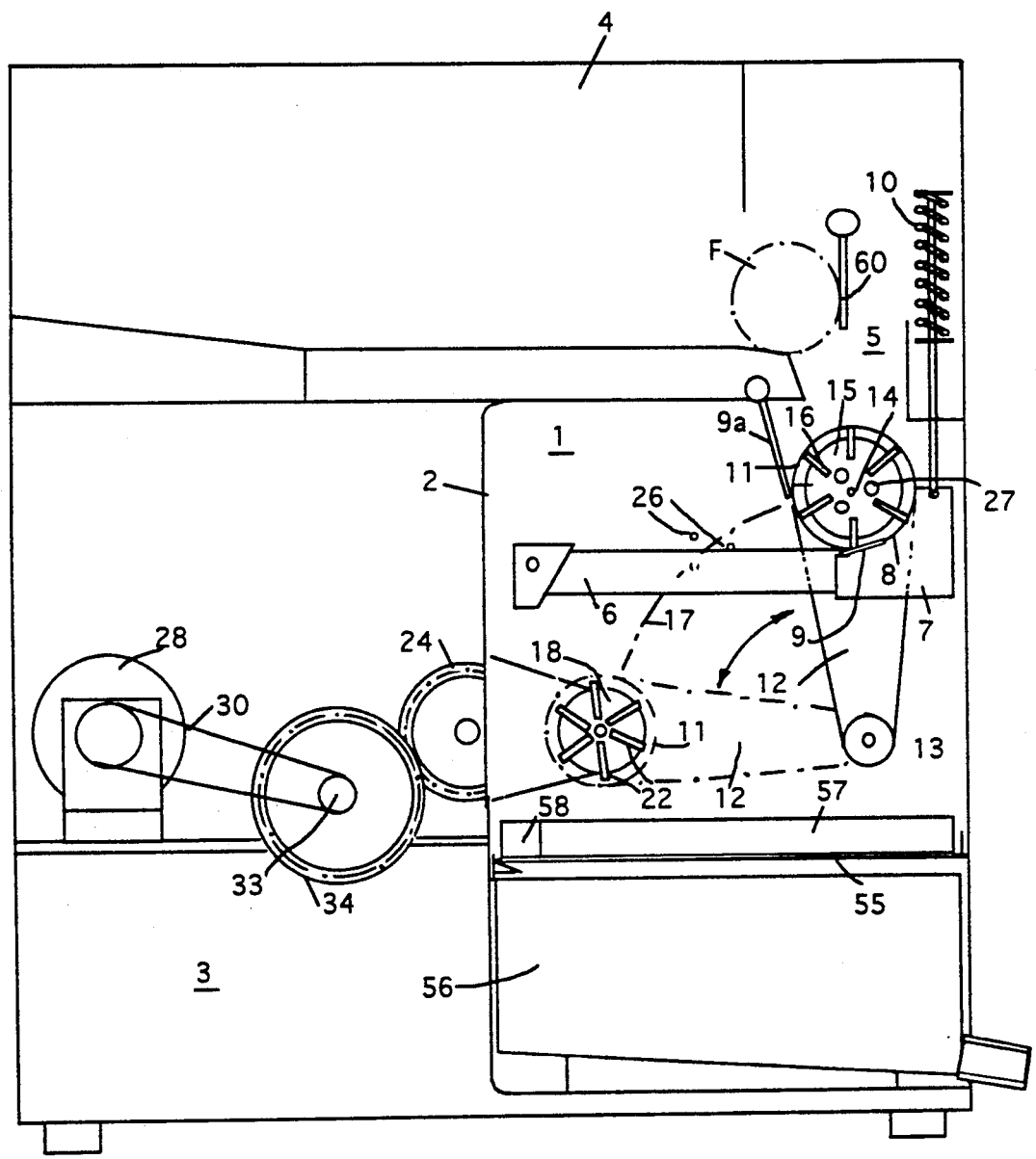
FIG. 2 is a side view of the apparatus.

The two clamping jaws 11 can be moved towards each other by means of the two lever pivot axles 13 by an axial displacement thereof, such that they grip the fruit located therebetween at opposite sides and clamp same whereby the holding spine 14 of the clamping jaw penetrates the fruit. The two clamping jaws 11 which hold the fruit can, furthermore, be pivoted by a rotating of the two lever pivot axes 13. In the first pivotal position the two clamping jaws are located vertically above the two lever pivot axes 13 (shown in solid lines in FIG. 2). When the two clamping jaws 11 which hold the fruit pivot due to a rotating of the two lever pivot axes 13, the arc 17 of the pivoting movement of the clamping jaws 11 intersects the knife 6 at an acute angle, which allows a conducting of the cutting operation by an action similar to the one of a cut performed by a pulling action at a small resistance.

At the back or inside, resp. wall of the housing 2 of the processing station a double side rasping head 18 is mounted for rotation. The rasping head 18 is located on the arc 17 of the pivoting movement of the clamping jaws 11 which, after having reached the rasping head 18, have travelled through a quarter of a circle(shown in broken lines in FIG. 2). During this pivoting movement the clamping jaws 11 move by an axial displacement of the corresponding lever pivot axes 13 so far from each other that the two clamping jaws 11, of which every one has a fruit half held therein, are located at both sides and centrally in front of the double side rasping head 18. In this second pivotal position the two clamping jaws 11 are then pressed by an axial displacement of the lever pivot axes 13 against the rotating rasping head 18 such that both fruit halves are simultaneously rasped out. For this task the rasping head 18 includes two hubs 21 located at a distance from each other on a central axis 20, which hubs 21 carry radially arranged vane disks 22 having an arcuate outer contour for the rasping. A gear wheel 23 is positioned on the axis 20 between the two hubs 21 which meshes with a further gear wheel 24 projecting through the wall of the housing 2 of the wet cell. The driving devices which will be described more in detail further below are located outside of the housing 2 which encloses the processing station and the processing station 1.

The hub 21 for the axis 20 of the rasping head 18 is mounted to a supporting arm 25 structured to encase the two gear wheels 23 and 24 in a casing like manner, supporting arm 25 being flanged onto the rear wall of the housing 2.

The housing 2 which in top view is of a square shape includes, furthermore, at each of the two opposite walls which extend at right angles from the wall of the housing which supports the rasping head three ejector pins 26 arranged along a circular line, which pins 26 project perpendicularly from the wall and are located on the line of the arc 17 of the pivoting movement of the two clamping jaws 11. Each clamping jaw 11 includes three through bores 27 (see FIG. 1) which are formed on a circle around the center of the clamping jaw and correspond to the ejector pins in such a manner that upon a movement of the clamping jaw in a direction towards the wall of the casing, the ejector pins 26 pass through the through bores 27 in order to eject the rind from the clamping jaw after the halves of the fruit have been rubbed out or rasped, resp., which proceeds in a third pivotal position of the clamping jaws during a short interruption of the pivoting movement from the second pivot position of the clamping jaws in front of the rasping head into the first pivot position or initial position of the clamping jaws above the end of the knife, whereby in this third pivot position each clamping jaw is moved in a lateral direction by an axial displacement of the corresponding lever pivot axes 13.

Figure 3:
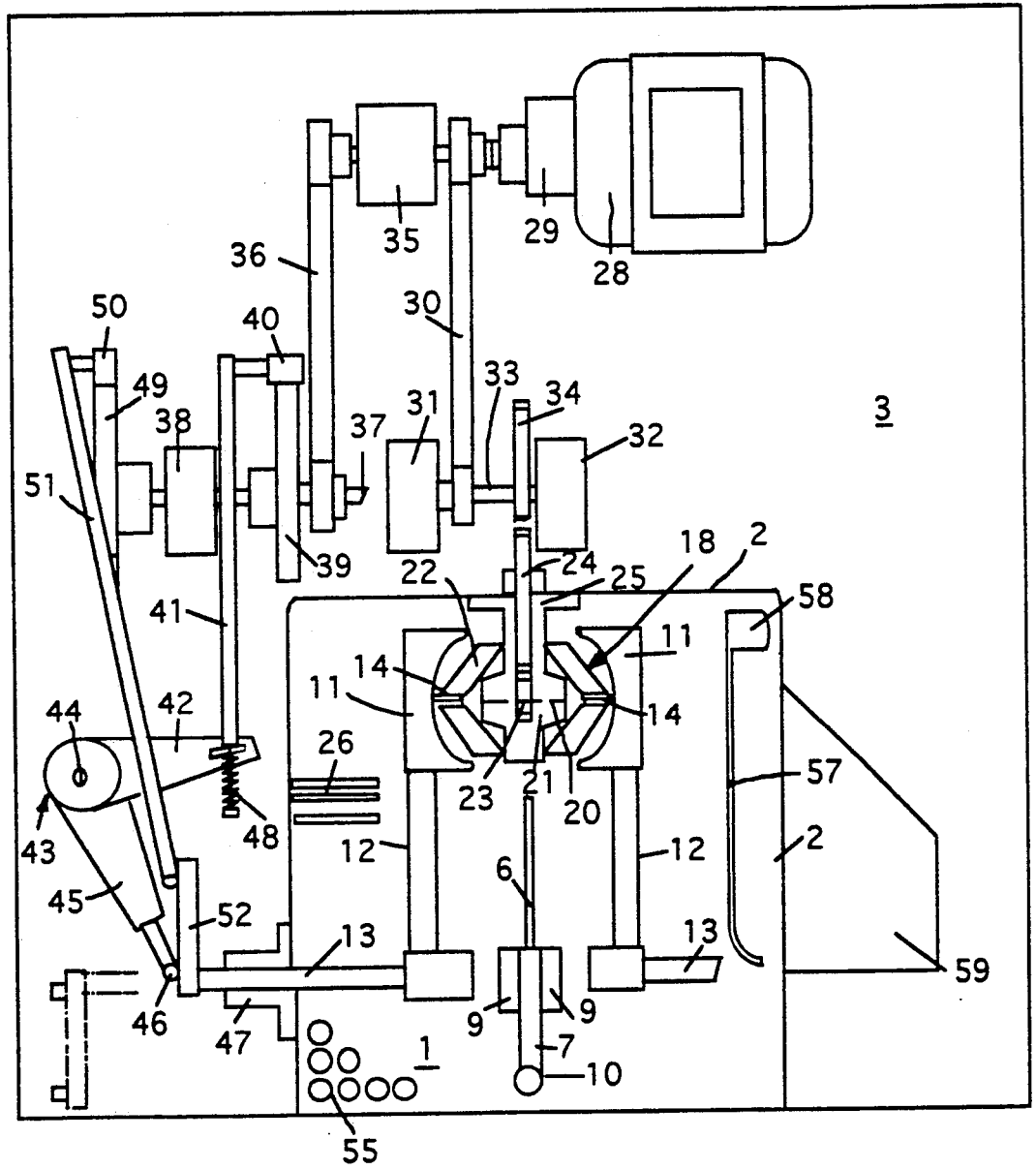
FIG. 3 is a top view of the apparatus without the supply container.

All movements of the two clamping jaws 11 are caused by the drive and control devices which are located in the chamber 3 which encloses the wet cell seen in top view in a U-like shape such as disclosed in FIG. 3. An electric motor 28 drives a speed reduction gear 29 mounted thereto, by means of which a belt drive 30 is driven, by means of which in turn a shaft 33 is driven which is supported in two bearing pedestals 31 and 32 which shaft 33 carries a gear wheel 34 which drives via the two already mentioned gear wheels 24 and 23 the double side rasping head 18 with a speed suitable for the rasping action. This speed is preferably 500 revolutions per minute.

A further speed reduction gear 35 which is coupled in after the first speed reduction gear 29 drives via a further belt drive 36 a shaft 37 which is supported in two bearing pedestals 38. In FIG. 3 only one bearing pedestal 38 is illustrated and only the further moving drive only for the left clamping jaw 11, because the not illustrated moving drive for the right clamping jaw 11 includes the same parts and is structured in a mirror like manner. At the shaft 37 which is illustrated broken off a first cam disk 39 is located which cooperates with a cam follower 40 at the end of a transmitting lever 41. This lever 41 is pivotally mounted to the end of one lever arm 42 of a double arm toggle joint 43 which is pivotally supported on a vertical axis 44, and of which the other lever arm 45 carries at its end a joint head 46 which forms the connection to the lever pivot axis 13. Latter is supported for a longitudinal displacement in a bearing 47 flanged onto the housing 2 in order to respectively change the distance between the two clamping jaws 11 for the various steps of the operation. This movement of the clamping jaws 11 in axial direction is thus controlled by the cam disk 39 and because it is the object, such as mentioned initionally to process citrus fruits having small and also large diameters, the control of the cam disk is designed in such a manner that, in the various pivotal positions upon a gripping of a fruit and rasping of a fruit, this fruit with the smallest diameter is firmly held, such that the two clamping jaws 11 in case of a fruit of a larger diameter are not to move that close towards each other if the fruit is not to be crushed for which reason an elastic element in form of a spring 48 is located at the rigid transmitting members and specifically between the transmitting lever 41 and the toggle joint 43, which spring is pressed together when processing a citrus fruit of a larger diameter.

The joint head 46 at the end of the lever pivot axis 13 allows a simultaneous rotating of this axis such that the clamping jaws 11 can attain the various pivotal positions. The changing of the pivotal position is controlled by a further cam disk 49 located on the same shaft 37, and which cooperates with a cam follower 50 at the end of a transmitting lever 51 which is pivotally mounted to a further lever 52 which is positioned on the lever pivot axis 13 and forms together with same a crank by means of which the lever pivot axis is pivoted back and forth between a first and a second pivotal position. In FIG. 3 one of these pivotal positions is illustrated by full lines and a further pivotal position is illustrated by dash-dotted lines.

The two cam disks 39 and 49 control all movements of each of the clamping jaws 11 during the entire course of movements when bisecting and rasping of a citrus fruit, i.e., the movement for grasping a citrus fruit falling out of the supply container between the clamping jaws, the pivotal movement over the knife 6 for bisecting the fruit, the movements of the clamping jaws against the rasping head 18 and away therefrom, the subsequent pivotal movement and axial movement towards the ejector pins 26 and the subsequent pivotal movement back into the initial position.

When rasping or rubbing out, resp. the citrus fruit, the juice flows through a screen floor 55 which closes off the processing station 1 at its bottom into a removable juice container 56 located thereunder. The pulp which has been rasped out remains on the screen floor 55 and is removed laterally at uniform time spans by means of a wiper arm 57 moving over the screen floor 55. The wiper arm 57 is pivotable back and forth parallel to the screen floor around a pivot axis 58 located vertically in a corner of the screen floor 55. In the position illustrated in FIG. 1 the wiper arm 57 has pushed the pulp up to an outlet chute 59 boardering the processing station 1 at a side thereof through which chute it falls vertically downwards into a not illustrated container. The wiper arm 57 moves upto in front of the wall of the housing 2 under the rasping head 18 and is lifted during this pivotal movement by means of a (not illustrated) cam control such that the pulp is not taken along during this phase of the movement and is transported to the chute 59 only during the movement in the opposite direction.

A here not specifically described control and regulating device which secures the correct sequence of the individual movements during a processing cycle belongs also to the apparatus, for instance a barrier 60 at the area of the discharge opening 5 of the supply container 4 and which opens in order to free the path for a further citrus fruit downwards only when the clamping jaws 11 are in their initial position in which position they can hold a fruit between themselves. The here not further described regulating device includes also the switch units arranged at various locations of the apparatus such as e.g., to stop the apparatus in case of a clogging by empty rinds.

While there is shown and described a preferred embodiment of the invention, it is clearly to be understood that it is not limited thereto but can be variously embodied and modified within the scope of the following claims.

I claim:
1. An apparatus for extracting juice from citrus fruit having rinds, said apparatus comprising:
   a supply container for a plurality of said citrus fruit, said supply container including a discharge opening for individual citrus fruit;
   a housing which defines a processing station located to receive said individual citrus fruit discharged from said supply container, said housing including therein
   a knife means including a knife blade having first and second ends, said first end of said knife blade being pivotally mounted in said housing and said second and including support members which are located centrally below said discharge opening of said supply container to support individual citrus fruit thereon,
   a rotatable rasping element having opposite first and second rasping heads, and
   first and second gripping means for gripping opposite sides of an individual citrus fruit and moving it so as to be cut and rasped, said first and second pivot arms which are movable along and including first and second pivot arms which are movable along and about a common axis and first and second clamping jaws connected to said first and second pivot arms, said first and second pivot arms being movable along and about said axis to cause said first and second clamping jaws to move together to grip an individual citrus fruit located on said support members in a first operating position of said clamping jaws, to cause said clamping jaws to move said citrus fruit past said knife blade at an acute angel so as to cut said citrus fruit into first and second fruit halves, to move said first and second clamping jaws apart and separate said first and second fruit halves, to move said first and second clamping jaws and said first and second fruit halves in line with said opposite first and second rasping head, and to move said first and second clamping jaws towards one another to move said first and second fruit halves into respective contact with said first and second rasping heads in a second operating position of said clamping jaws to achieve simultaneous extraction of juice therefrom, thereby leaving first and second treated fruit halves located within said first and second clamping jaws.

2. The apparatus of claim 1, wherein said knife means includes spring means connected to said support members so that said support members will position an individual citrus fruit thereon in register with said clamping jaws when moved into their first operating position.

3. The apparatus of claim 1, wherein said housing includes opposite walls that each mount inwardly-extending ejector pins located in a corresponding predetermined pattern, wherein said first and second clamping jaws include openings therein in a pattern that corresponds to said predetermined pattern, and wherein said first and second clamping jaws are moved by said first and second pivot arms such that said ejector pins extend into and through said openings in said first and second clamping jaws to dislodge the first and second treated fruit halves located respectively therein in a third operating position of said clamping jaws.

4. The apparatus of claim 1, wherein said first and second gripping means include first and second axles that extend along said axis and to which said first and second pivot arms are respectively connected, said first and second axles including portions that extend through opposite walls of said housing, and including first and second movement means for longitudinally moving said first and second axles along said axis, each of said first and second said movement means including a pivotally supported double-arm angular lever having a first and second lever arms, said first lever arm including a joint head attached to a respective axle; a drive shaft, a first cam disk mounted on said drive shaft; and a transmitting lever connected at one end thereof to said first cam disk and at an opposite end to said second lever arm by a spring means; said first and second movement means enabling said axles to move longitudinally toward and away from one another and to cause said clamping jaws to grip an individual citrus fruit therebetween without destruction.

5. The apparatus of claim 4, wherein each of said movement means includes a second cam disk connected to said drive shaft, and a pair of crank levers connected between said second dam disk and a respective axle to cause rotation thereof.

6. The apparatus of claim 5, including drive means connected to said rasping element to rotate said rasping element.

7. The apparatus of claim 3, including a screen means located below said gripping means and including a wiper blade which is movable over said screen means to sweep fruit pulp laterally off said screen means.

* * * * *